United States Patent
Swinney et al.

(10) Patent No.: US 10,859,104 B2
(45) Date of Patent: Dec. 8, 2020

(54) SOLID SURFACE REINFORCEMENT SYSTEM

(71) Applicant: Omni Cubed, Inc., Shingle Springs, CA (US)

(72) Inventors: Stephen Paul Swinney, Placerville, CA (US); Larry Leigh Livingston, Jr., Cameron Park, CA (US)

(73) Assignee: OMNI CUBED, Inc., Shingle Springs, CA (US)

(*) Notice: Subject to any disclaimer, the term of this patent is extended or adjusted under 35 U.S.C. 154(b) by 21 days.

(21) Appl. No.: 16/358,493

(22) Filed: Mar. 19, 2019

(65) Prior Publication Data

US 2020/0300282 A1 Sep. 24, 2020

(51) Int. Cl.
| | | |
|---|---|---|
| F16B 7/04 | (2006.01) | |
| B25B 5/10 | (2006.01) | |
| F16B 47/00 | (2006.01) | |
| F16B 5/12 | (2006.01) | |
| B66C 1/02 | (2006.01) | |

(52) U.S. Cl.
CPC ............ *F16B 7/0493* (2013.01); *B25B 5/102* (2013.01); *F16B 5/123* (2013.01); *F16B 47/00* (2013.01); *B66C 1/0243* (2013.01)

(58) Field of Classification Search
CPC ......... B25B 5/003; B25B 5/102; B25B 5/103; F16B 5/123; F16B 7/0493; F16B 47/00; B66C 1/0243
USPC ............................................. 294/65; 403/400
See application file for complete search history.

(56) References Cited

U.S. PATENT DOCUMENTS

| | | | | |
|---|---|---|---|---|
| 3,574,364 A | * | 4/1971 | Langren | F16B 7/0493 403/395 |
| 3,677,582 A | * | 7/1972 | Flick | E04G 7/24 403/391 |
| 5,860,197 A | * | 1/1999 | Fox | B25B 1/103 24/455 |
| 6,349,912 B1 | * | 2/2002 | Schauss | E04B 1/58 248/228.1 |
| 7,931,420 B2 | * | 4/2011 | Maffeis | E04B 1/585 403/400 |
| 8,047,516 B2 | * | 11/2011 | Livingston, Jr. | B25B 1/2405 269/249 |
| 9,016,740 B2 | * | 4/2015 | Chou | B25J 15/0061 294/65 |

* cited by examiner

*Primary Examiner* — Dean J Kramer
(74) *Attorney, Agent, or Firm* — Manuel de la Cerra

(57) ABSTRACT

A clamp for reinforcing a solid surface is disclosed and may be used with a top rail and a bottom rail. The clamp has a top jaw and a bottom jaw, each with a channel constructed to receive and align the top and bottom rails respectively in a first direction and a second direction. Each jaw has its own channel lip, shaft hole, and alignment pin hole. An alignment pin may be disposed of in the pin holes to inhibit the rotation of the jaws relative to each other. A shaft may be disposed of in the shaft holes, and the shaft may be at least partially threaded with a knob connected to the shaft. The clamp may have three configurations: a locked configuration; a sliding configuration; and a rail removal configuration. Multiple clamps may be used to construct a multidimensional frame to reinforce and support the solid surface.

17 Claims, 12 Drawing Sheets

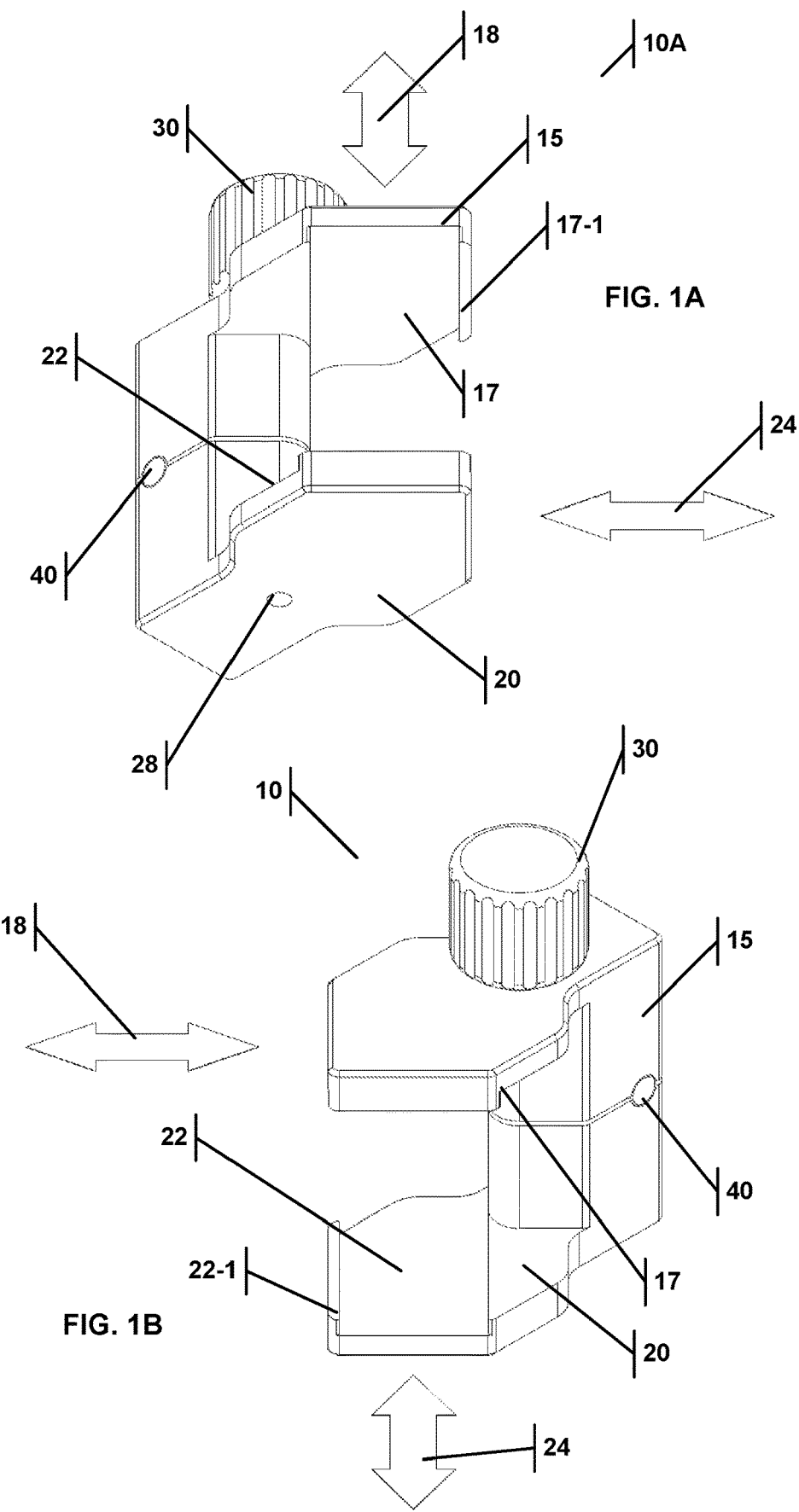

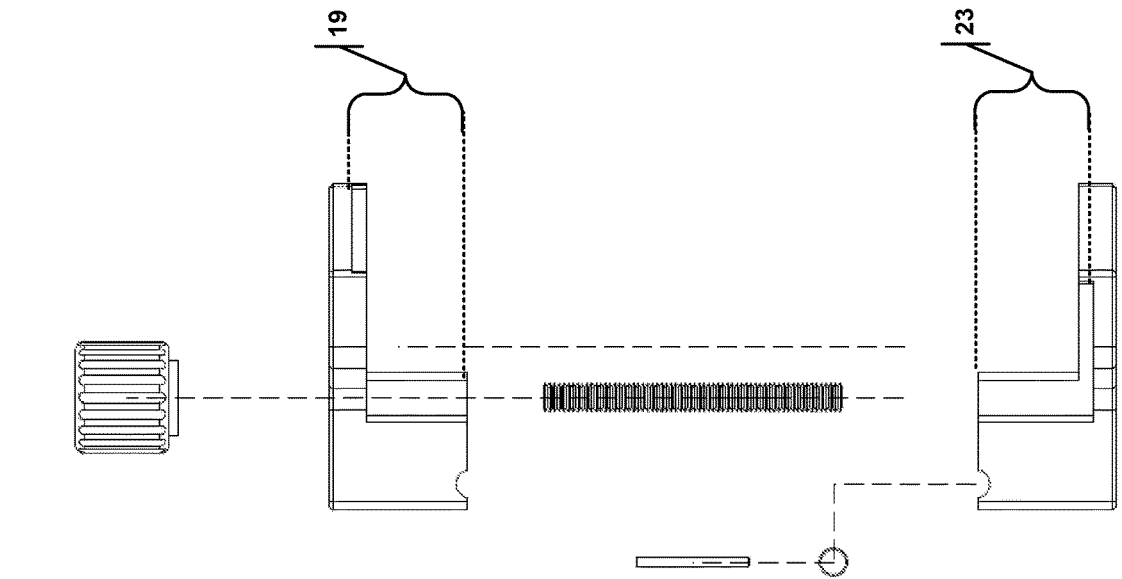
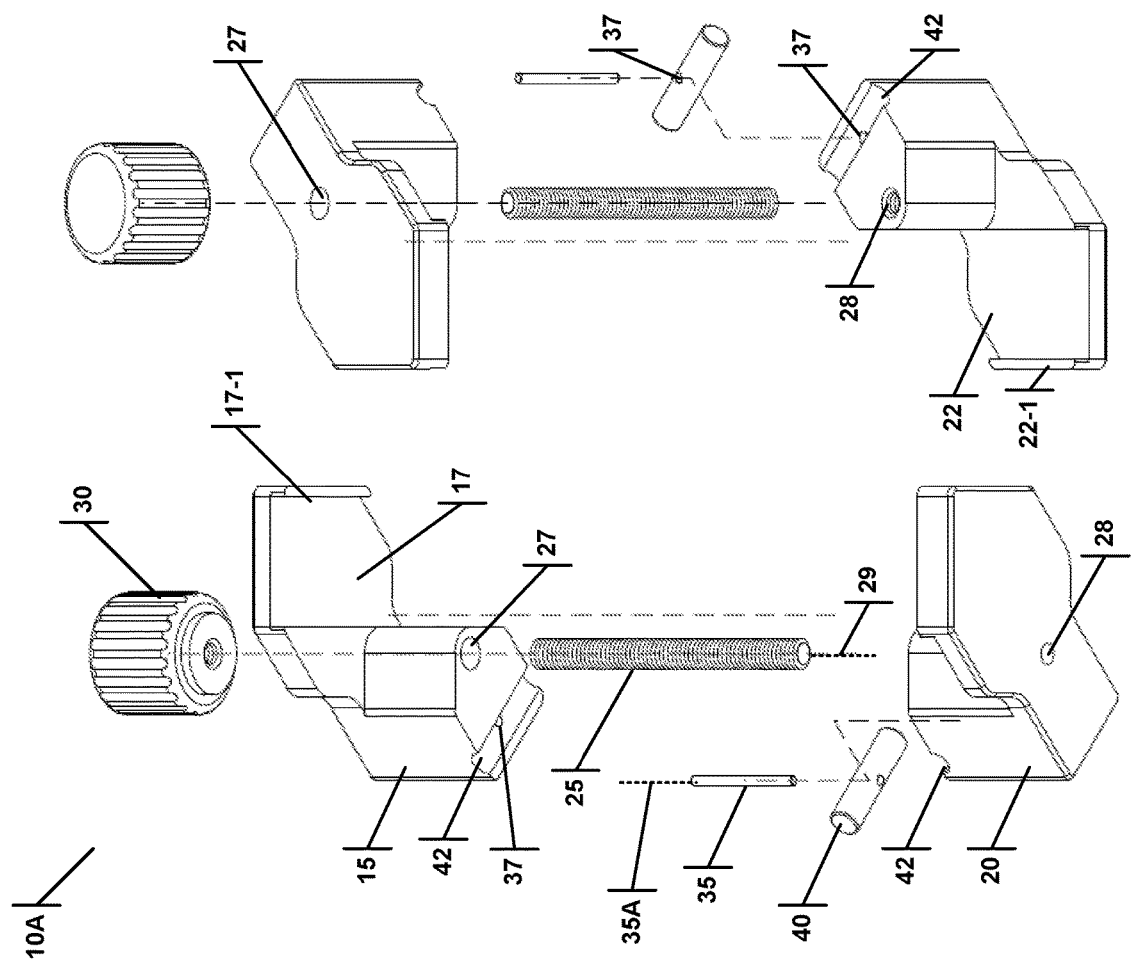

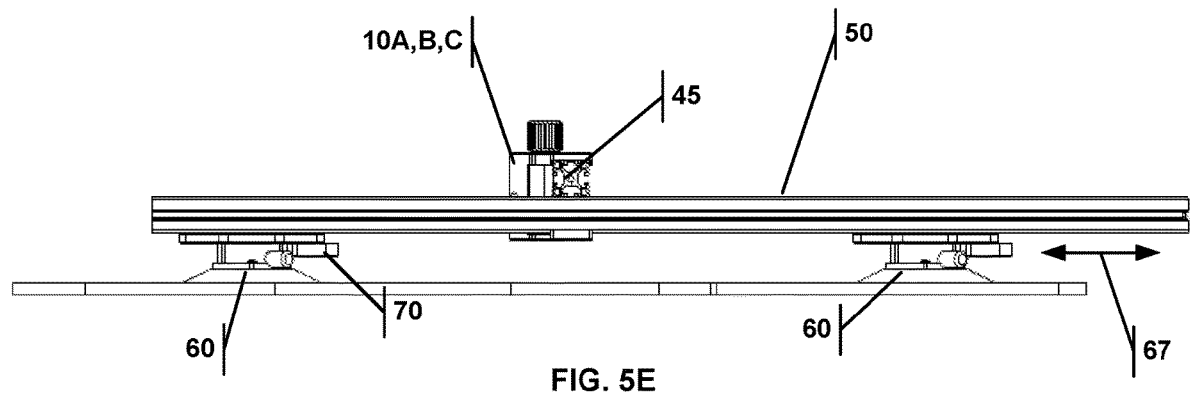
FIG. 5E
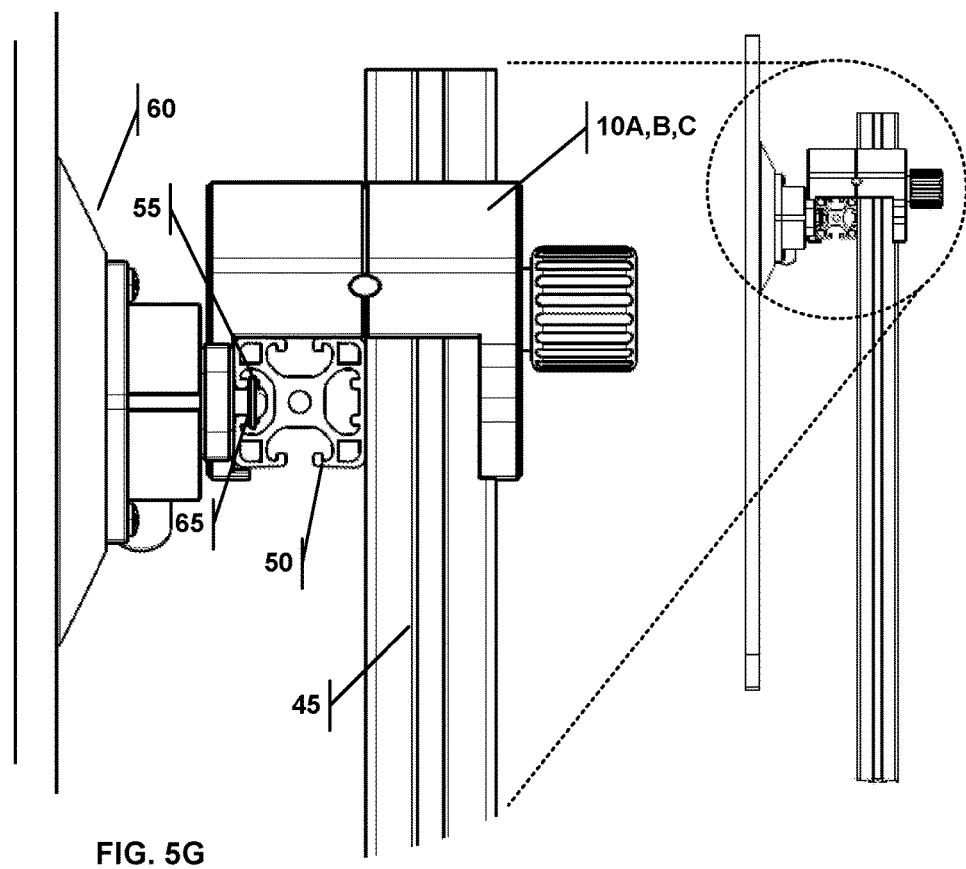
FIG. 5G
FIG. 5F

SOLID SURFACE REINFORCEMENT SYSTEM

CROSS-REFERENCE TO RELATED APPLICATIONS

None

FIELD OF THE INVENTION

This invention relates to tools used in the stone fabrication and installation industry.

BACKGROUND

The demand for solid-surface countertops such as granite, marble, engineered stone, and Corian® has steadily risen over the past decade. As the demand for solid-surface countertops, vanities, tub decks, fireplace mantles and hearths continues to grow, it becomes more imperative for solid-surface fabrication companies to work faster, without sacrificing quality, in order to meet this demand.

Handling and installing these solid surfaces can be difficult with current methods and devices. For example, a large slab of material may have a cutout in it to allow for the installation of a sink or a cooktop range. This slab will have weak points along the cutout portion, such that the installer must take care when handling and installing piece. Installers may use, for example, multiple suction cups connected to a longer beam that keeps fragile material from flexing and/or breaking during transport, installation and general handling. This is shown in FIG. 8.

Unfortunately, the prior art design has several problems. Because the beams are independent of each other, the slab can nevertheless experience torsion and crack. The art also provides no easy and expandable mechanism to create a large multi-dimensional frame that would address the torsional forces for a variety of solid surface shapes and sizes.

What is therefore needed is a solid surface reinforcement system that that overcomes these deficiencies.

SUMMARY

The present invention provides an elegant solution to the needs described above and offers numerous additional benefits and advantages, as will be apparent to persons of skill in the art. A clamp for reinforcing a solid surface is disclosed and may be used with a top rail and a bottom rail. The clamp has a top jaw and a bottom jaw, each with a channel constructed to receive and align the top and bottom rails respectively in a first and second direction. Each jaw has its own channel lip, shaft hole, and alignment pin hole. An alignment pin may be disposed of in the pin holes to inhibit the rotation of the jaws relative to each other. A shaft may be disposed of in the shaft holes, and the shaft may be at least partially threaded with a knob connected to the shaft. The clamp may have three configurations: (1) a locked configuration; (2) a sliding configuration; and (3) a rail removal configuration. Multiple clamps and multiple rails may be used to construct a frame in multiple dimensiosn to reinforce and support the solid surface.

In the locked configuration, the knob is turned to bring the jaws together and create a top rail/bottom rail pressure junction between rails, during which the rails are fixed in position relative to each other and to the clamp.

In the sliding configuration, the knob is turned to separate the jaws relative to the locked configuration and to release the top rail/bottom rail pressure junction between rails. The sliding configuration is further characterized in that the top rail can slide along the first direction but is inhibited from sliding in a direction other than the first direction by the top channel lip; the bottom rail can slide along the second direction but is inhibited from sliding in a direction other than the second direction by the bottom channel lip.

And in the rail removal configuration, the knob is turned to separate the jaws relative to the sliding configuration. The rail removal configuration is further characterized in that the jaws are connected to each other with the alignment pin inhibiting the rotation of the jaws relative to each other; the top rail can slide past the top channel lip in a direction other than the first direction; the bottom rail can slide past the bottom channel lip in a direction other than the second direction.

The top jaw may have a secondary pin saddle, and the bottom jaw may have a secondary pin saddle. The clamp may have a secondary alignment pin. During the locked configuration, the secondary alignment pin may be disposed of in the top and bottom jaw secondary pin saddles, further inhibiting the rotation of the top jaw relative to the bottom jaw.

The top jaw may have a secondary keyed alignment structure, and the bottom jaw may have a secondary complementary alignment structure. During the locked configuration, the secondary keyed alignment structure may mate with the secondary complementary alignment structure, further inhibiting the rotation of the top jaw relative to the bottom jaw.

The bottom shaft hole may be threaded to receive the threaded portion of the shaft, such that turning the knob threads the shaft into the bottom shaft hole and moves the bottom jaw relative to the top jaw.

The threaded portion of the shaft may exit the top jaw and the knob may be threaded such that turning the knob threads the knob onto the shaft and moves the bottom jaw relative to the top jaw.

The shaft may define a shaft longitudinal axis, and the alignment pin may define an alignment pin longitudinal axis, wherein these axes are orthogonal to each other. The shaft longitudinal axis can also define a plane, and the alignment pin allows limited rotation of the top jaw relative to the bottom jaw in the plane.

In addition to having the alignment holes in the top and bottom jaws, or as an alternative thereto, the top shaft hole may be non-circular, and a portion of the shaft may also be non-circular such that the shaft slides within the top shaft hole and inhibits the rotation of the top jaw relative to the bottom jaw.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments.

Furthermore, various features of different disclosed embodiments can be combined to form additional embodiments, which are part of this disclosure. It will be understood that certain components and details may not appear in the figures to assist in more clearly describing the invention.

FIG. 1A is a bottom perspective view of a novel clamp.

FIG. 1B is a top perspective view of the novel clamp of FIG. 1A.

FIG. 2A is a bottom exploded perspective view of the novel clamp of FIG. 1A.

FIG. 2B is a top exploded perspective view of the novel clamp of FIG. 1A.

FIG. 2C is a side exploded view of the novel clamp of FIG. 1A.

FIG. 5E is a top view of the solid surface reinforcement of FIG. 5A.

FIG. 5F is a side view of the solid surface reinforcement of FIG. 5A.

FIG. 5G is an enlarged side view of the solid surface reinforcement of FIG. 5A, detailing the connection of the suction cup to the bottom rail.

DETAILED DESCRIPTION

Figure 1C:
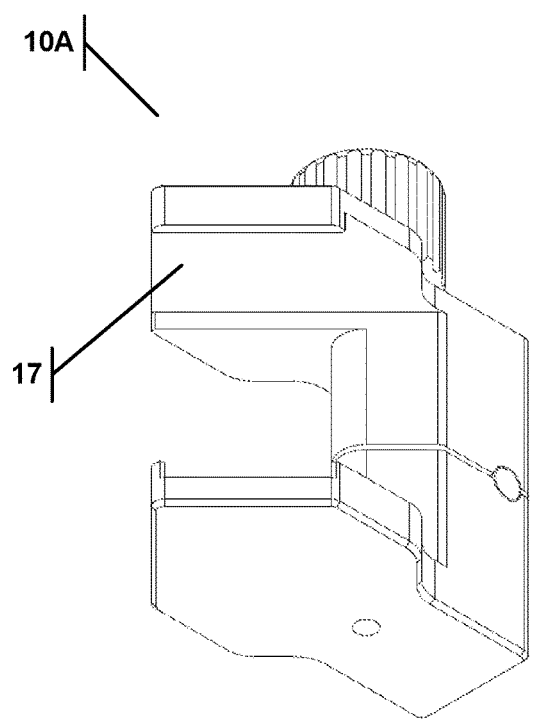
FIG. 1C is a bottom perspective view of the novel clamp of FIG. 1A.
Figure 1D:
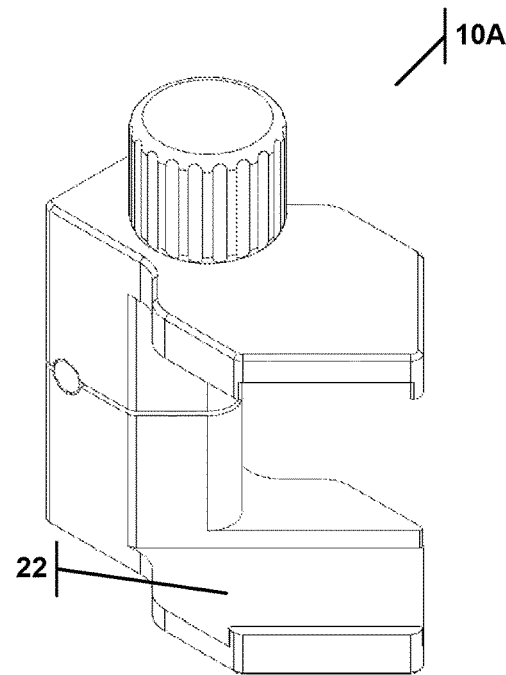
FIG. 1D is a top perspective view of the novel clamp of FIG. 1A.
Figure 1E:
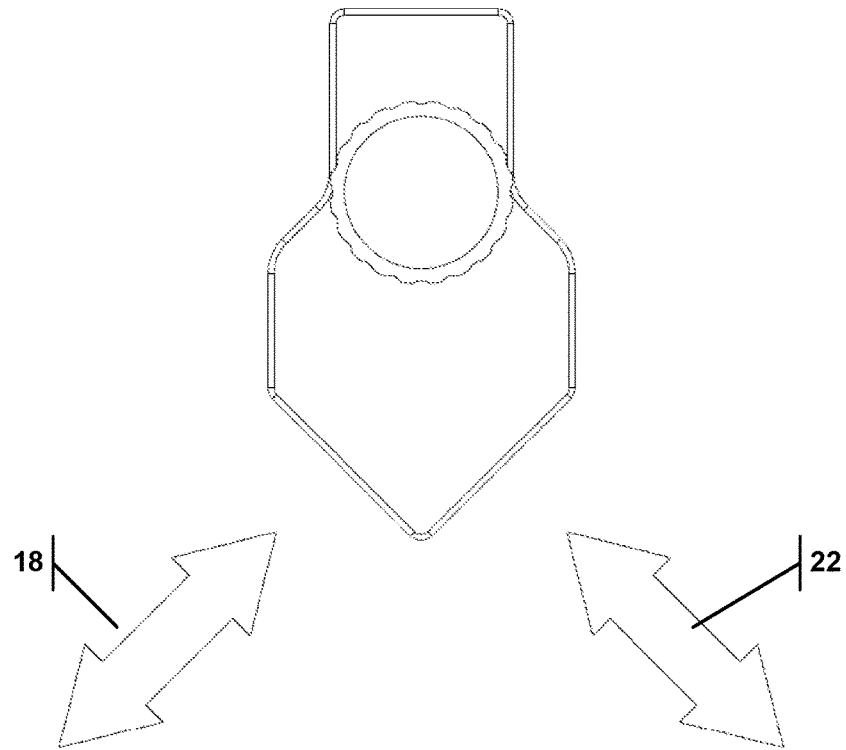
FIG. 1E is a top view of the novel clamp of FIG. 1A.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

Clamp 10A, 10B, 10C
Top Jaw 15
Top Channel 17
Top Channel Lip 17-1
First Direction 18
Top Rail Clearance 19
Bottom Jaw 20
Bottom Channel 22
Bottom Channel Lip 22-1
Bottom Rail Clearance 23
Second Direction 24
Threaded Shaft 25
Non-circular Threaded Shaft 25A
Non-circular Shaft Portion 26
Top Shaft Hole 27
Top Shaft Hole Non-Circular 27A
Bottom Shaft Hole 28
Longitudinal Axis of Threaded Shaft 29
Nut/Knob 30
Alignment Pin 35
Alignment Pin Longitudinal Axis 35A
Limited Rotation 36
Primary Alignment Pin Holes 37
Secondary Alignment Pin 40
Secondary Alignment Pin Saddle 42
Secondary Keyed Alignment Structure 42A
Secondary Complementary Alignment Structure 42B
Solid Surface Reinforcement System 43
Solid Surface 44

Top Rail 45
Bottom Rail 50
Top Rail/Bottom Rail Pressure Junction 52
Bottom Rail Channel 55
Suction Cup 60
Suction Cup Channel Traveler 65
Suction Cup Sliding Direction 67
Suction Cup Locking Handle 70
Solid Surface Reinforcement System (4 Clamps, 4 Rails) 75
Cut Out Opening 80

FIGS. 1A-1E disclose a clamp 10A for reinforcing a solid surface. The clamp 10A has a top jaw 15 and bottom jaw 20. The top jaw 15 has a top channel 17 with a top channel lip 17-1 constructed to receive and align a top rail (shown in FIGS. 5A-5G as rail 45). The construction of the top channel 17 and lip 17-1 restricts the movement of the top rail along a first direction 18. The bottom jaw 20 has similar features as the top jaw 20, including a bottom channel 22 with a bottom channel lip 22-1 constructed to receive and align a bottom rail (shown in FIGS. 5A-5G as rail 50). The construction of the bottom channel 22 and lip 22-1, however, restricts the movement of the bottom rail along a second direction 24, which is substantially orthogonal to the first direction 18.

FIGS. 2A-2C illustrate the clamp 10A in an exploded view. The clamp 10A has a top shaft hole 27 and a bottom shaft hole 28, into which a shaft 25 may be disposed. The shaft 25 may be at least partially threaded with a knob 30 connected to the shaft 25. Each jaw may also have an alignment pin hole 37 into which an alignment pin 35 may disposed to inhibit to rotation of the jaws (15, 20) relative to each other.

The clamp 10A may have three configurations: (1) a locked configuration; (2) a sliding configuration and (3) a rail removal configuration. In the locked configuration, the knob 30 is turned to bring the jaws (15, 20) together and create a top rail/bottom rail pressure junction 52 between rails (as shown in FIG. 5B), during which the rails (15, 20) are fixed in position relative to each other and to the clamp 10A.

In the sliding configuration, the knob 30 is turned to separate the jaws (15, 20) relative to the locked configuration and release the top rail/bottom rail pressure junction 52 between rails. The sliding configuration is further characterized in that the top rail 45 can slide along the first direction 18 but is inhibited from sliding in a direction other than the first direction 18 by the top channel lip 17-1. Similarly, the bottom rail 50 can slide along the second direction 24 but is inhibited from sliding in a direction other than the second direction 24 by the bottom channel lip 22-1.

And in the rail removal configuration, the knob 30 is turned to separate the jaws (15, 20) relative to the sliding configuration. The rail removal configuration is further characterized in that: the jaws (15, 20) are connected to each other with the alignment pin 35 inhibiting the rotation of the jaws (15, 20)-relative to each other. Also in this configuration the top rail 45 can slide past the top channel lip 17-1 in a direction other than the first direction 18, and likewise the bottom rail 50 can slide past the bottom channel lip 22-1 in a direction other than the second direction 24.

The top jaw 15 may have a secondary pin saddle 42, and the bottom jaw 20 may have a secondary pin saddle 42, and the clamp 10A may have a secondary alignment pin 40. During the locked configuration, the secondary alignment pin 40 may be disposed of in the top and bottom jaw secondary pin saddles 42, further inhibiting the rotation of the top jaw 15 relative to the bottom jaw 20. The secondary alignment pin 40 may also have an alignment hole 37 in which the alignment pin 40 may be disposed. In clamp 10A, the shaft has a longitudinal axis 29 that is parallel to the longitudinal axis of the alignment pin 35A.

The bottom shaft hole 28 may be threaded receive the threaded portion of the shaft 25, such that turning the knob 30 threads the shaft 25 into the bottom shaft hole 28 and moves the bottom jaw 20 relative to the top jaw 15.

Figure 7C:
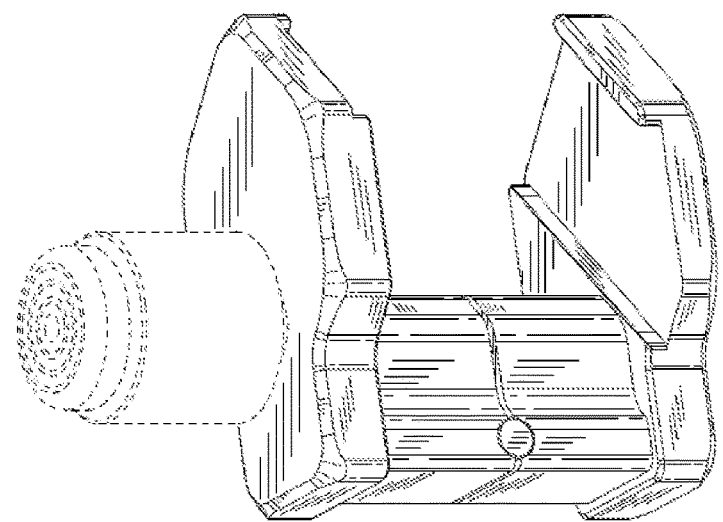
FIG. 7C is a top left perspective view of the novel clamp of FIG. 7A.
Figure 7B:
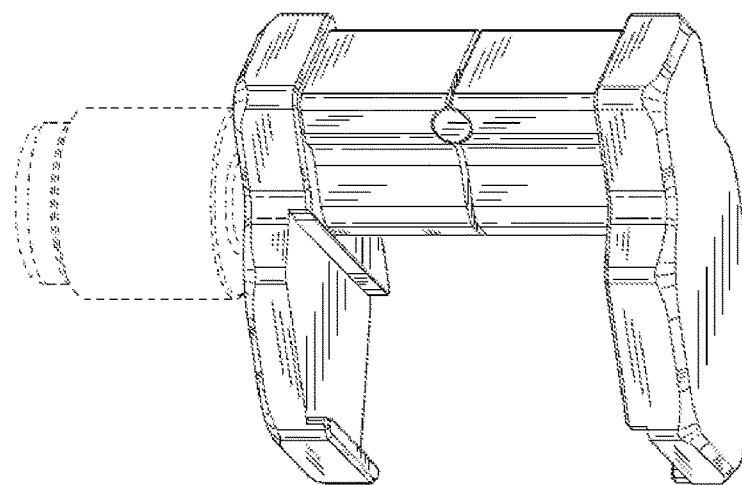
FIG. 7B is bottom right perspective view of the novel clamp of FIG. 7A.
Figure 7A:
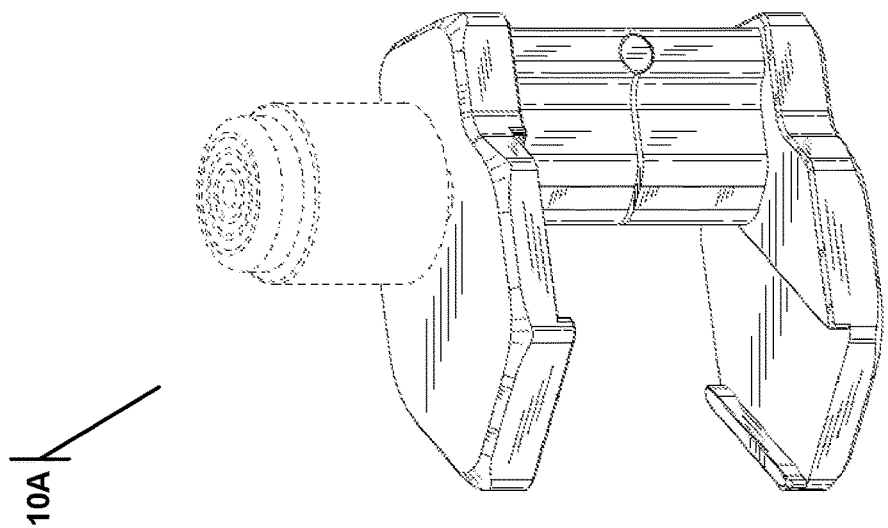
FIG.7A is a top right perspective view of a novel clamp.
Figure 8:
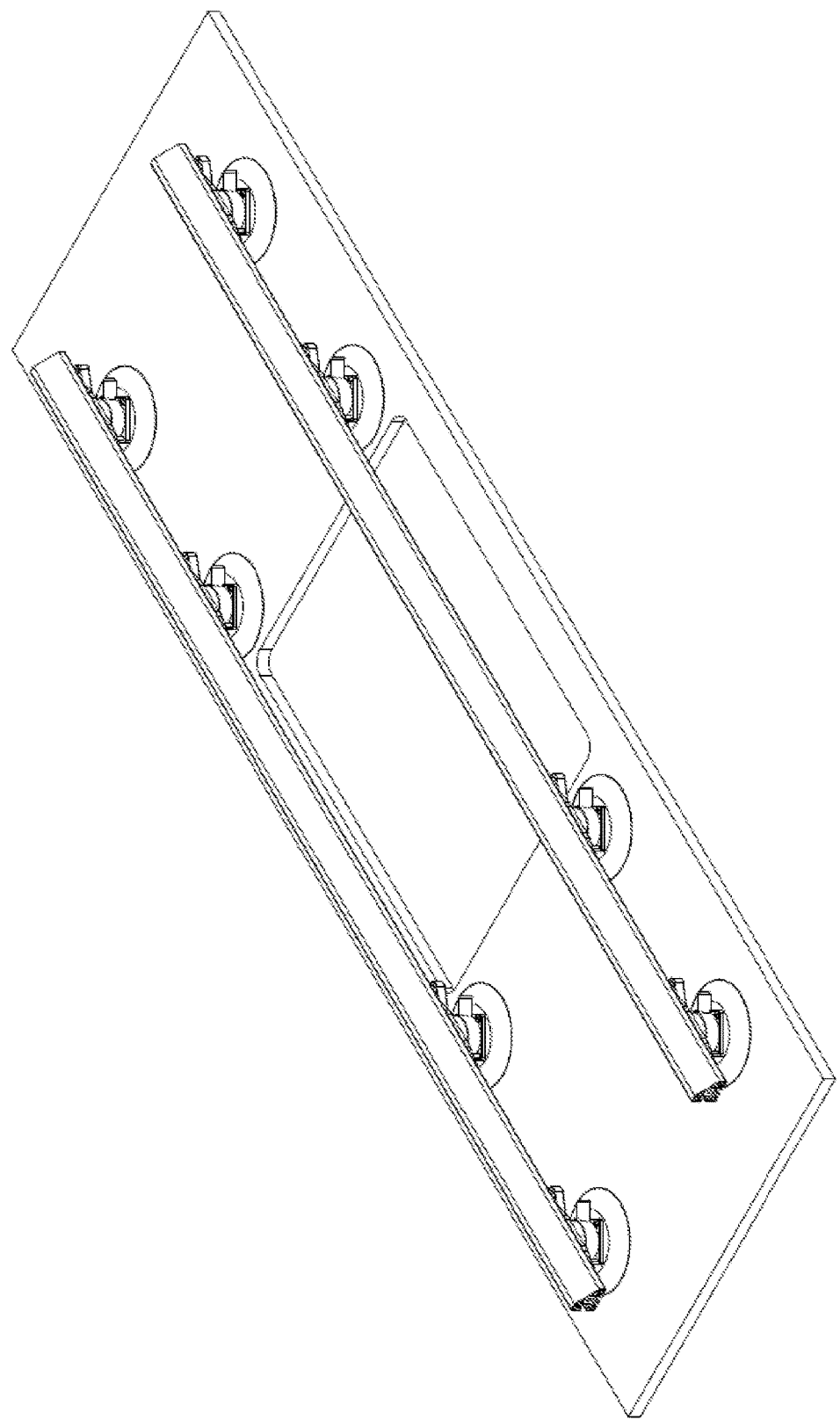
FIG. 8 is a prior art reinforcement apparatus.

The threaded portion of the shaft 25 may exit the top jaw 15, and the knob 30 may be threaded such that turning the knob 30 threads the knob 30 onto the shaft 25 and moves the bottom jaw 20 relative to the top jaw 15. FIGS. 7A, 7B, and 7C show various perspective view of clamp 10A.

Figure 3C:
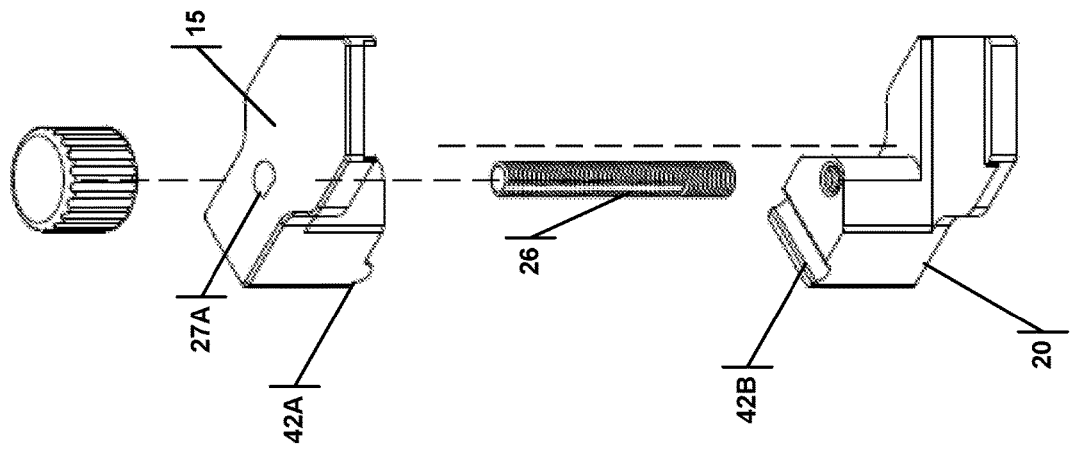
FIG. 3C is a top exploded perspective view of the novel clamp of FIG. 3A.
Figure 3B:
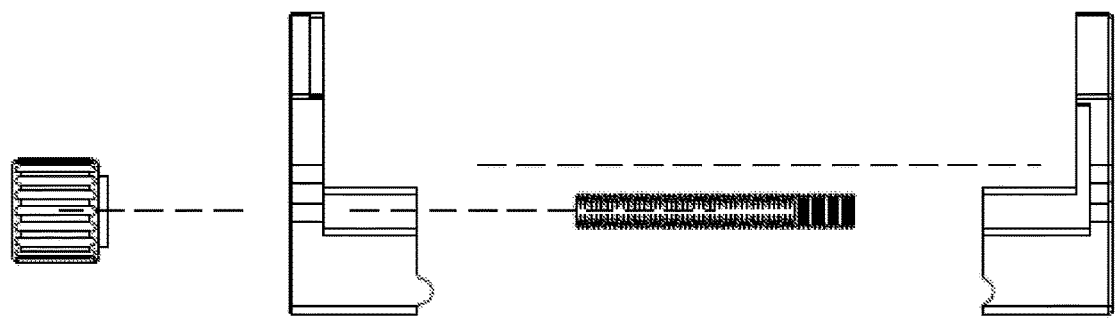
FIG. 3B is a side exploded view of the novel clamp of FIG. 3A.
Figure 3A:
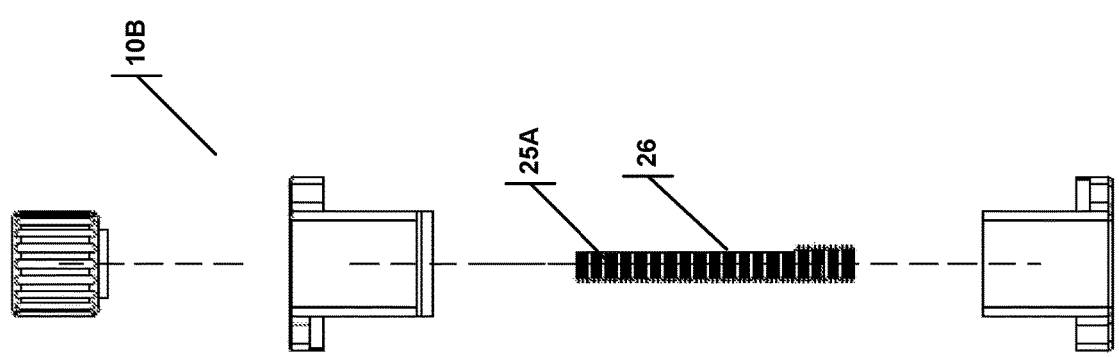
FIG. 3A is a side back exploded view of a novel clamp with a non-circular threaded shaft.
Figure 4C:
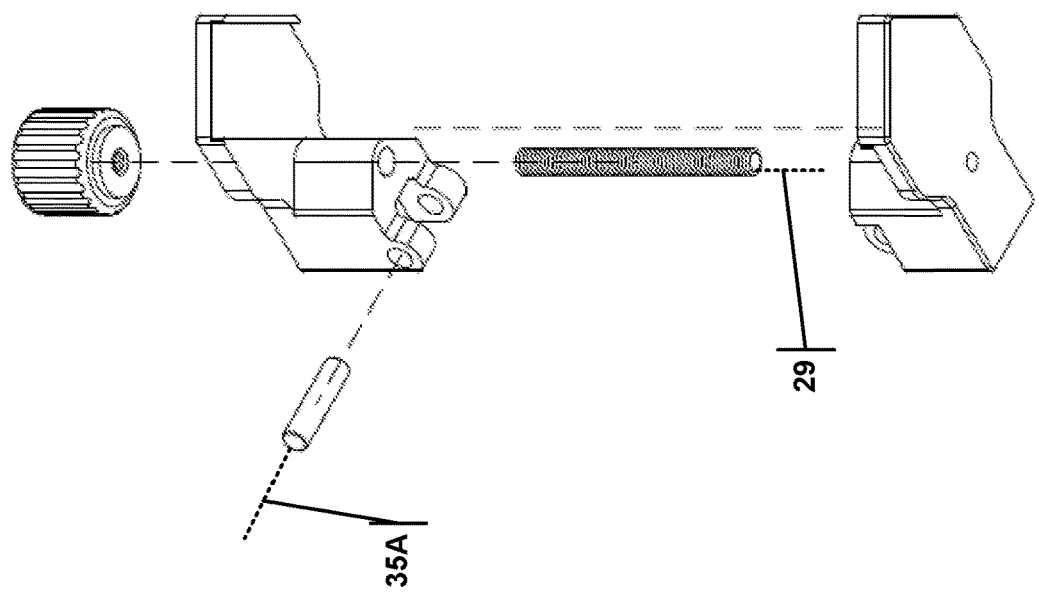
FIG. 4C is a bottom exploded perspective view of the novel clamp of FIG. 4A.
Figure 4B:
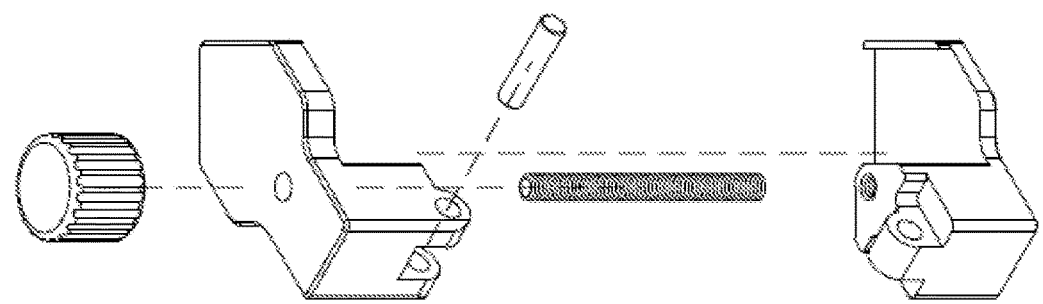
FIG. 4B is a top back exploded perspective view of the novel clamp of FIG. 4A.
Figure 4A:
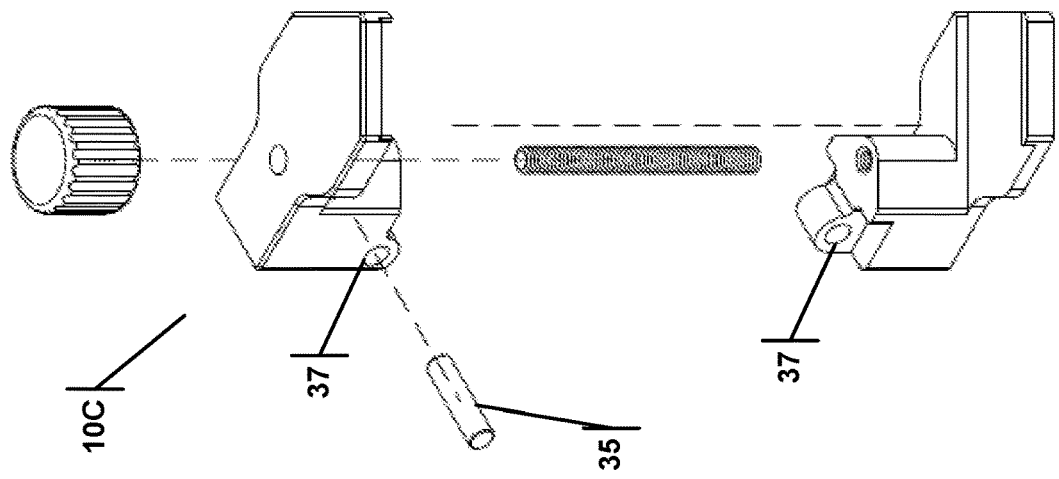
FIG. 4A is a top front exploded perspective view of a novel clamp with a hinge.
Figure 4F:
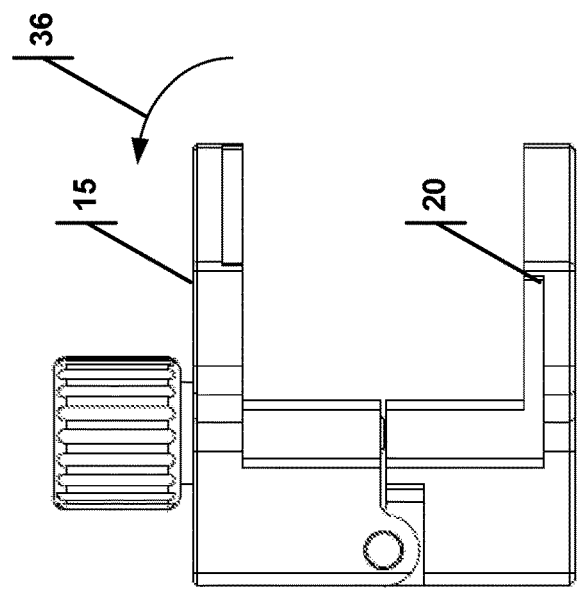
FIG. 4F is a side view of the novel clamp of FIG. 4A.
Figure 4E:
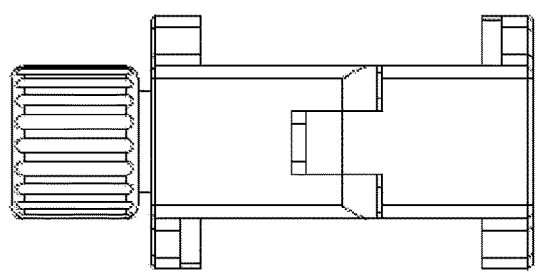
FIG. 4E is a back view of the novel clamp of FIG. 4A.
Figure 4D:
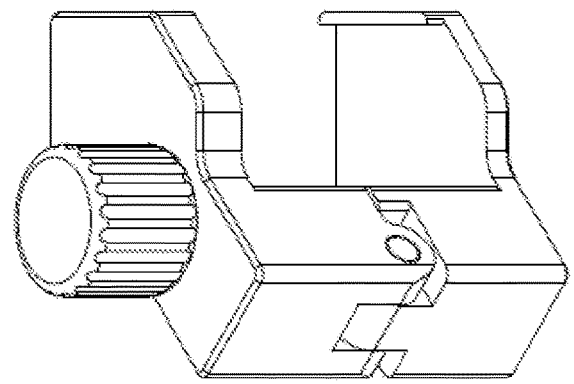
FIG. 4D is a top perspective view of the novel clamp of FIG. 4A.

FIGS. 3A-3C illustrate a second embodiment of the clamp 10B, in an exploded view. The clamp 10B has many of the same components and features as already detailed with respect to the first embodiment 10A. Clamp 10B has two major differences. First, the top shaft hole 27A may be non-circular, and a portion 26 of the shaft 25A may also be non-circular, such that the shaft 25A slides within the top shaft hole 27A and inhibits the rotation of the top jaw 15 relative to the bottom jaw 20. Second, the top jaw may have a secondary keyed alignment structure 42A, and the bottom jaw may have a secondary complementary alignment structure 42B. During the locked configuration, the secondary keyed alignment structure 42A may mate with the secondary complementary alignment structure 42B, further inhibiting the rotation of the top jaw 15 relative to the bottom jaw 20. This second feature can be used in the first embodiment (clamp 10A) as a replacement for the secondary alignment pin 40 and secondary alignment pin saddles 42.

FIGS. 4A-4F illustrate a third embodiment of the clamp 10C in an exploded view. The clamp 10C has many of the same components and features as already detailed with respect to the first and second clamp embodiments. In this embodiment, the alignment pin 35 has an alignment pin longitudinal axis 35A that is orthogonal to that of the threaded shaft 29. The alignment pin 35 is disposed of in the alignment pin holes 37 of the top and bottom jaws. In both the sliding and rail removal configurations, the top jaw 15 has limited rotation (arrow 36) relative to the bottom jaw 20. To provide this limited rotation, the alignment pin hole 37 of either the top or bottom jaw may allow for a certain amount of play or slop. Alternatively, the top shaft hole may also provide slop. However, when the clamp 10C is in the locked configuration, the knob 30 provides the needed constraining force that tightens the entire clamp 10C such that the slop no longer allows rotation or other movement.

Figure 5A:
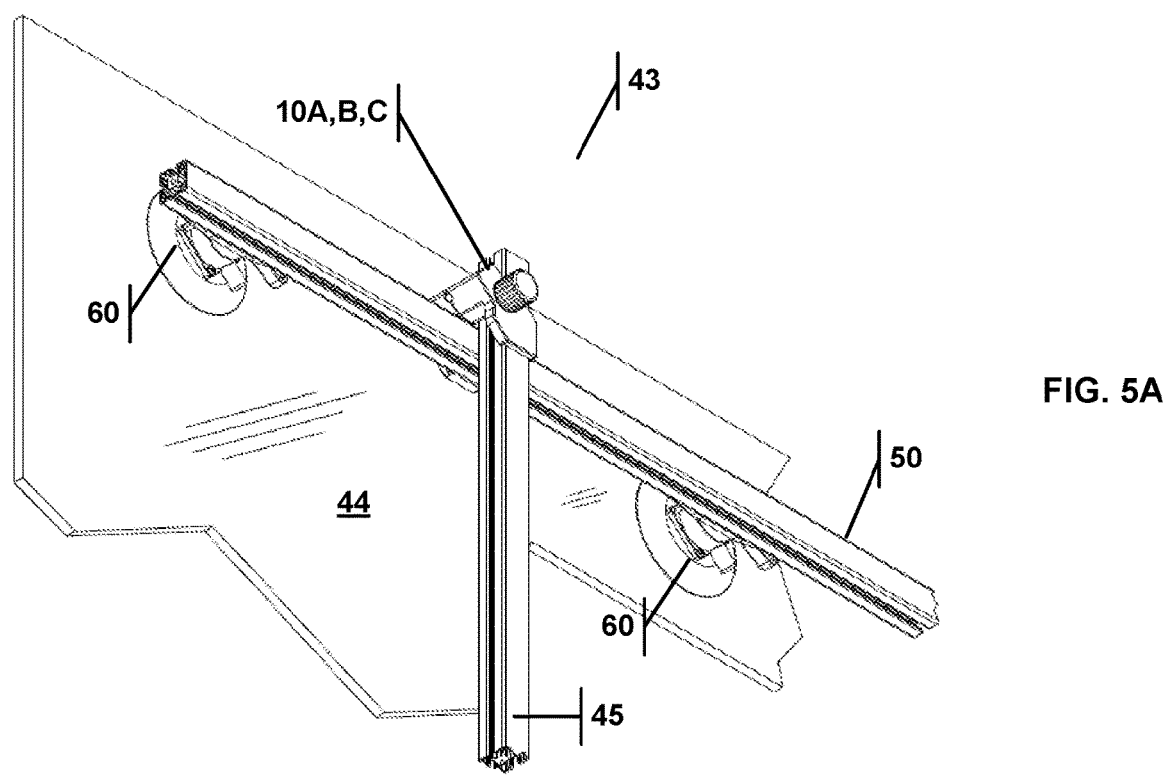
FIG. 5A is a bottom left perspective view of a solid surface reinforcement system attached to a solid surface.
Figure 5B:
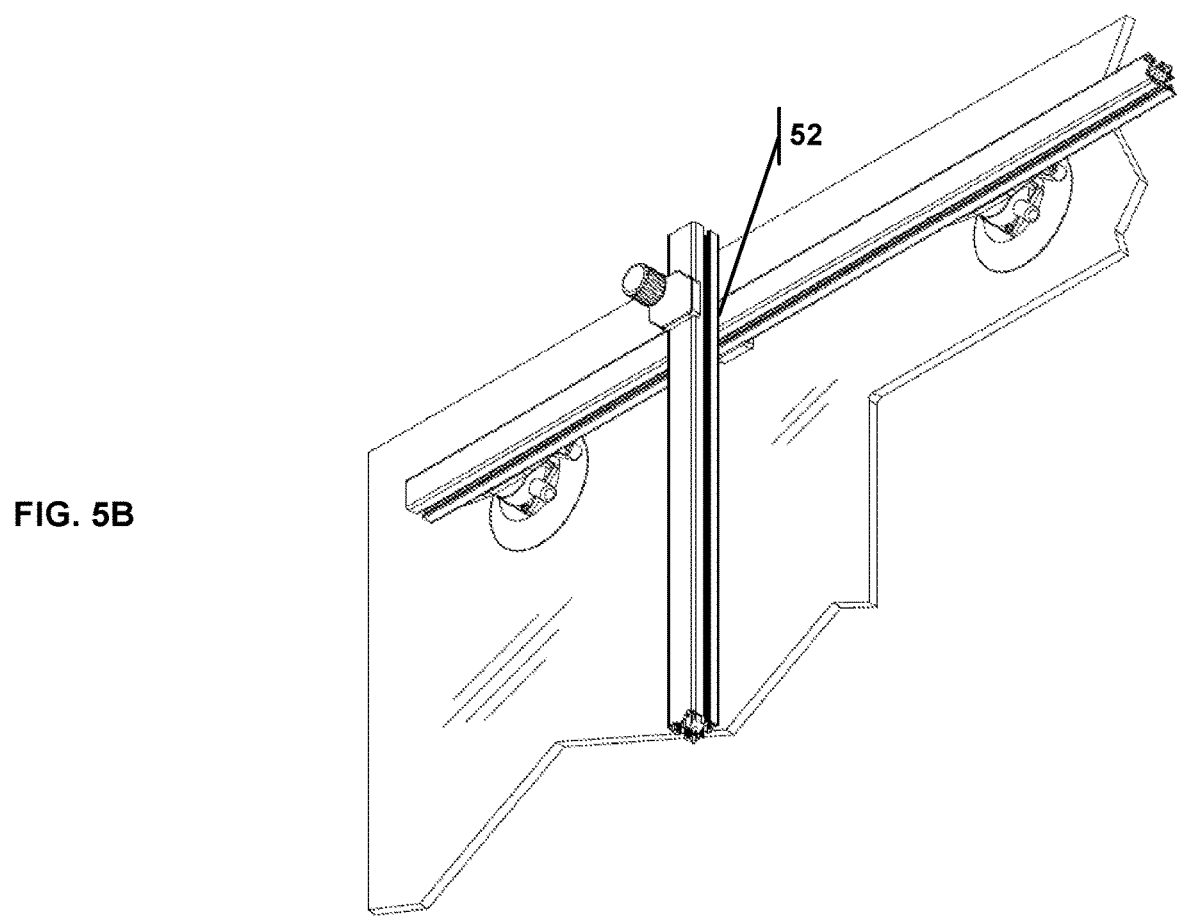
FIG. 5B is a bottom right perspective view of the solid surface reinforcement system of FIG. 5A.
Figure 5C:
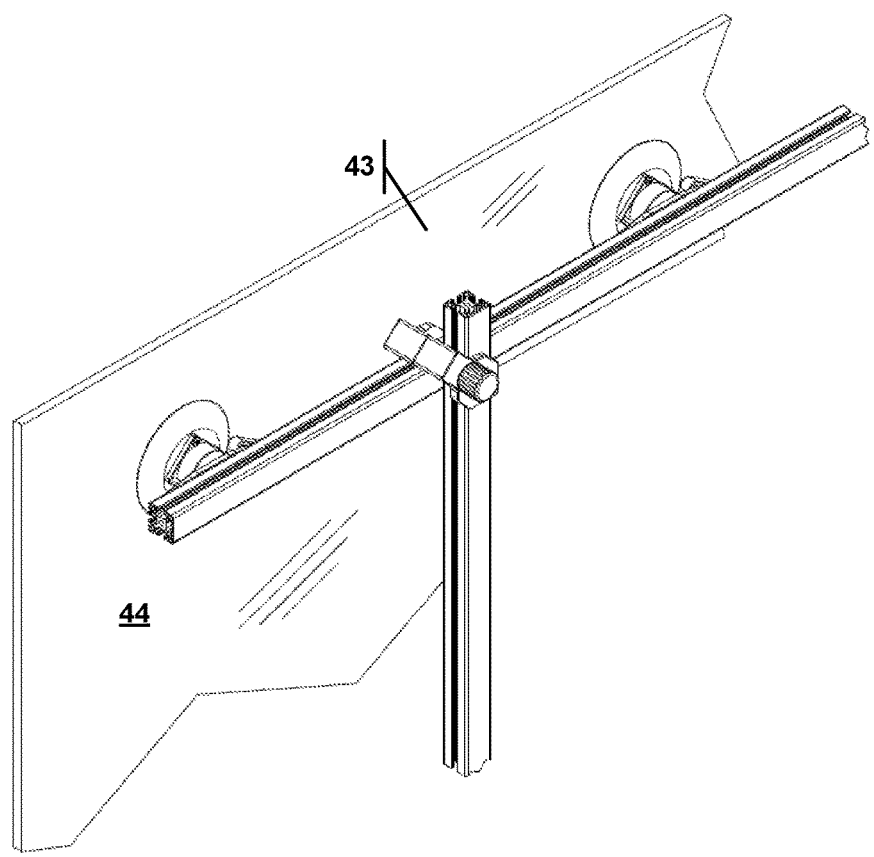
FIG. 5C is a top left perspective view of the solid surface reinforcement of FIG. 5A.
Figure 5D:
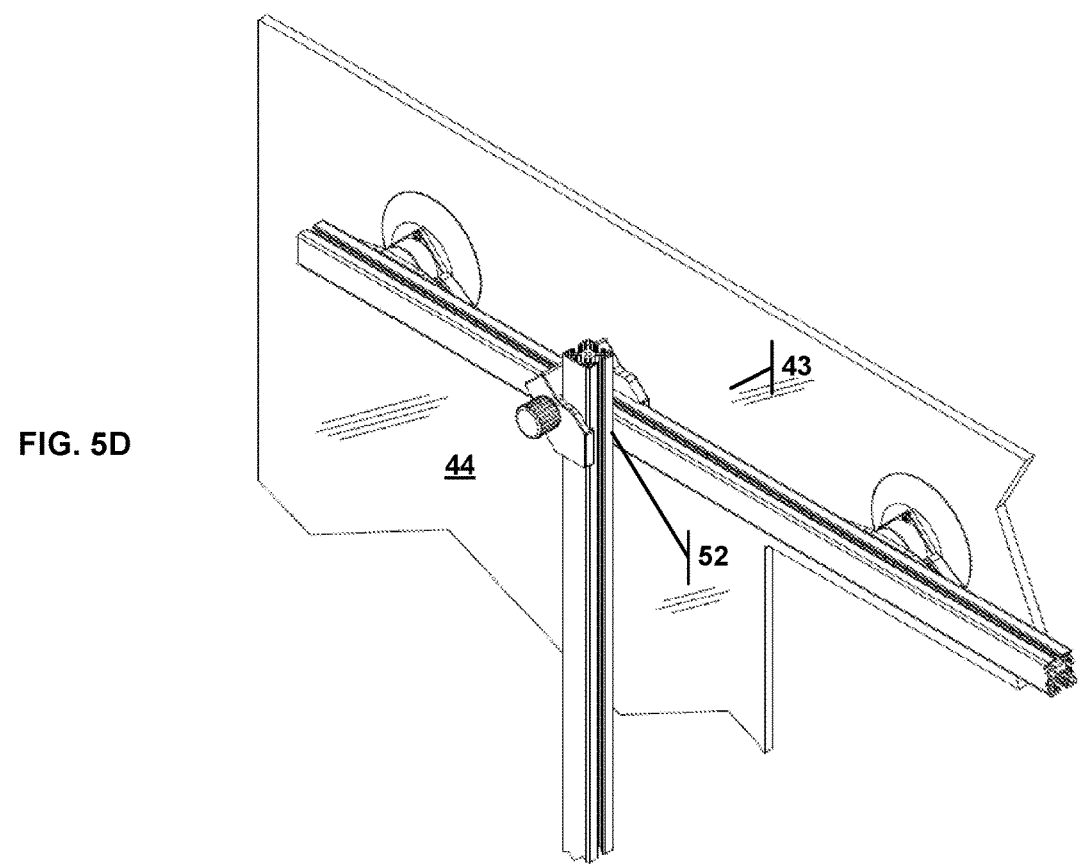
FIG. 5D is a top right perspective view of the solid surface reinforcement of FIG. 5A.

A solid surface reinforcement system 43 may be constructed from multiple clamps and multiple rails, as shown in FIGS. 5A-5G. This system 43 may provide reinforcement to a solid surface 44 during handling and installation. The system may include a several structures 60 to connect to the solid surface 44. These structures 60 may be, but are not limited to, a suction cup, clamp or a temporary adhesive. FIGS. 5E and 5G illustrate the bottom rail 50 connected to a clamp (10A,B,C) with two connecting structures 60 (suction cups). The bottom rail 50 may have bottom rail channel 55 into which a traveler structure 65 connected to the connecting structure 60 may slide in the direction of arrow 67. This allows for the movement of the connecting structure 60 (suction cups) along any position of the bottom rail 50. The connecting structure 60 may have a locking handle 70 that, when actuated, restricts the movement of the connecting structure 60 within the bottom rail channel 55.

Figure 6A:
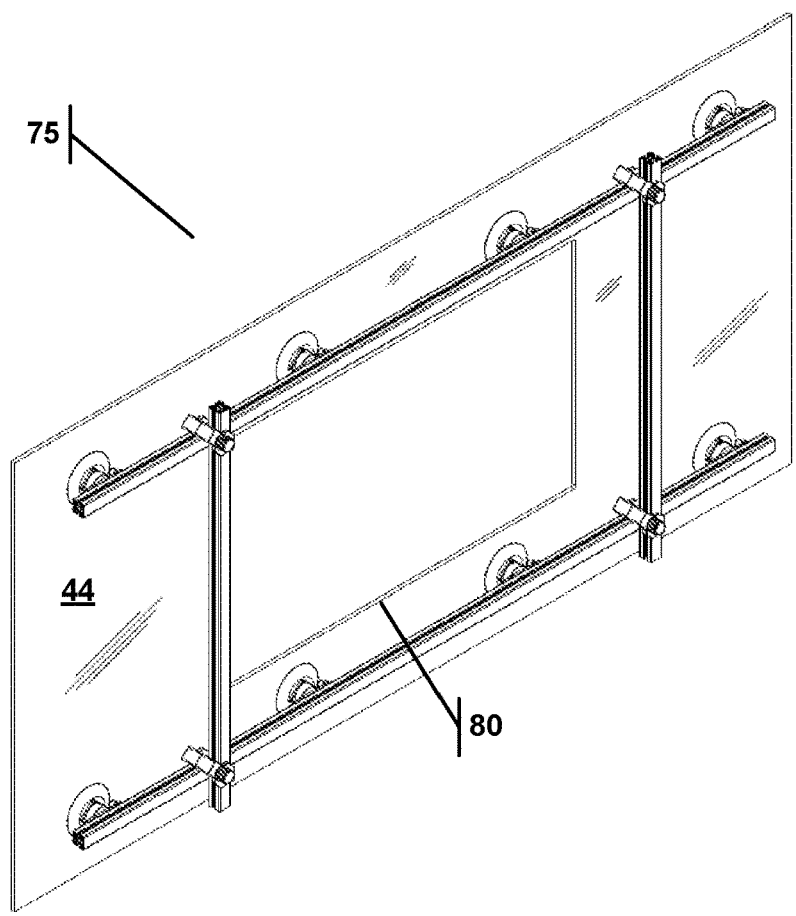
FIG. 6A is a top left perspective view of a complete solid surface reinforcement system attached to a solid surface with a cut out.
Figure 6B:
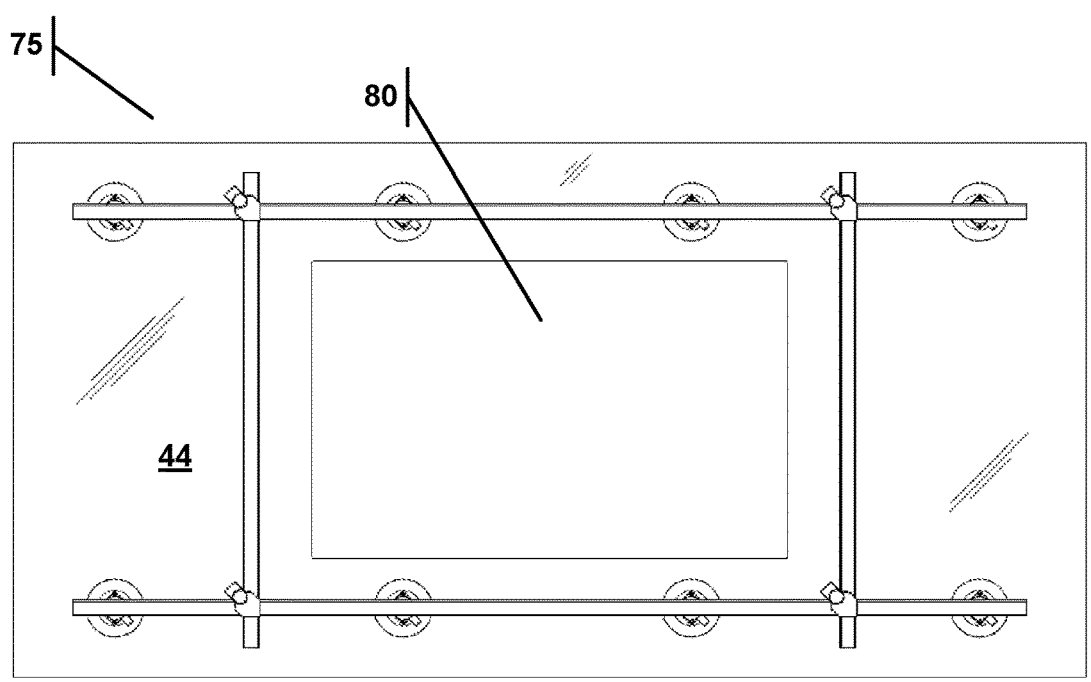
FIG. 6B is a front view of the complete solid surface reinforcement system of FIG.64A.

Operation of the system is as follows. The set of connection structures within a rail are secured to the solid surface and a second bottom rail with a set of connection structures is also secured to the sold surface. Four clamps are placed into the rail removal configuration, and two clamps are connected to each rail. Two top rails are then place substantially orthogonal to the bottom rails and disposed of in the clamps. The clamps are tightened to the sliding configuration, and the rails are slid relative to the clamp until they are in the proper position to provide support and reinforcement. Then the clamps are tightened to the locked configuration, making the system (comprised of four clamps and four rails) a solid and stable frame. The completed and installed solid surface reinforcement system 75 is shown in FIGS. 6A and 6B. While the solid surface shown has a cutout 80, the system may also be used to reinforce and support a solid surface that is simply fragile because it is comprised of a fragile material, or fragile because material thickness is thin. Also, the solid surface reinforcement system is expandable and may include more rails, more clamps and more connecting structures.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently-preferred embodiment of the invention and are therefore representative of the subject matter which is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. A solid surface reinforcement system for use with a solid surface, the system comprising:
   a first top rail and a first bottom rail;
   a first clamp comprising:
      a top jaw with a top channel constructed to receive and align the first top rail in a first direction, the top jaw comprising a top channel lip, a top shaft hole, and a top alignment pin hole;
      a bottom jaw with a bottom channel constructed to receive and align the first bottom rail in a second direction that is substantially orthogonal to the first direction the bottom jaw comprising a bottom channel lip, a bottom shaft hole, and a bottom alignment pin hole;
      an alignment pin disposed of in the top and bottom alignment pin holes, constructed to inhibit the rotation of the top jaw relative to the bottom jaw, the alignment pin defining an alignment pin longitudinal axis;
      a shaft disposed of in the top and bottom shaft holes, wherein at least a portion of the shaft is threaded, the shaft defining a shaft longitudinal axis that is orthogonal to the alignment pin longitudinal axis;
      a knob connected to the shaft;
      the first clamp having three configurations when the first top rail is disposed of in the top channel, and the first bottom rail is disposed of in the bottom channel:
         a locked configuration where the knob is turned to bring the jaws together and to create a top rail/bottom rail pressure junction between rails, during which the rails are fixed in position relative to each other and to the first clamp;
         a sliding configuration where the knob is turned to separate the jaws relative to the locked configuration and to release the top rail/bottom rail pressure junction between rails, wherein the sliding configuration is further characterized in that:
            the first top rail can slide in the first direction but is inhibited from sliding in a direction other than the first direction by the top channel lip; and
            the first bottom rail can slide in the second direction but is inhibited from sliding in a direction other than the second direction by the bottom channel lip; and
         a rail removal configuration, where the knob is turned to separate the jaws relative to the sliding configuration, wherein the rail removal configuration is further characterized in that:
            the jaws are connected to each other with the alignment pin inhibiting the rotation of the jaws relative to each other;
            the first top rail can slide past the top channel lip in a direction other than the first direction; and
            the first bottom rail can slide past the bottom channel lip in a direction other than the second direction.

2. The system of claim 1, further comprising a structure constructed to connect to the solid surface, the structure connected to the first bottom rail.

3. The system of claim 2, wherein the structure is a suction cup or a clamp.

4. The system of claim 1, wherein the bottom shaft hole is threaded and receives the threaded portion of the shaft; wherein turning the knob threads the shaft into the bottom shaft hole and moves the bottom jaw relative to the top jaw.

5. The system of claim 1, wherein the threaded portion of the shaft exits the top jaw and the knob is threaded; wherein turning the knob threads the knob onto the shaft and moves the bottom jaw relative to the top jaw.

6. The system of claim 1 wherein shaft longitudinal axis defines a plane, and the alignment pin allows limited rotation of the top jaw relative to the bottom jaw in the plane.

7. A solid surface reinforcement system for use with a solid surface, the system comprising:
   a first top and first bottom rail;
   a first clamp comprising:
      a top jaw with a top channel constructed to receive and align the first top rain in a first direction, the top jaw comprising: a top channel lip, a top shaft hole, a top alignment pin hole, and a secondary pin saddle;
      a bottom jaw with a bottom channel constructed to receive and align the first bottom rail in a second direction that is substantially orthogonal to the first direction: the bottom jaw comprising a bottom channel lip, a bottom shaft hole, a bottom alignment pin hol, and a secondary pin saddle;
   an alignment pin disposed of in the top and bottom alignment pin holes, constructed to inhibit to rotation of the top jaw relative to the bottom jaw;
   a secondary alignment pin;
   a shaft disposed of in the top and bottom shaft holes, at least a portion of the shaft is threaded;
   a knob connected to the shaft;
   the first clamp having three configurations when the first top rail is disposed of in the top channel and the first bottom rail is disposed of in the bottom channel: a
  locked configuration where the knob is turned to bring
  the jaws together and
create a top rail/bottom rail pressure junction between
  rails, during which (1) the rails are fixed in position
  relative to each other and to the first clamp, and (2)
  the secondary alignment pin is disposed of in the top
  and bottom jaw secondary pin saddles, further inhibiting the rotation of the top jaw relative to the bottom
  jaw;
a sliding configuration where the knob is turned to seperate the jaws relative to the locked configuration and
  release the top rail/bottom rail pressure junction
  between rails, the sliding configuration is further characterized in that:
  the first top rail can slide in the first direction but is
    inhibited from sliding in a direction other than the
    first direction by the top channel lip; and
  the first bottom rail can slide in the second direction but
    is inhibited from sliding in a direction other than the
    second direction by the bottom channel lip, and
a rail removal configuration where the knob is turned to
  seperate the jaws relative to the sliding configuration,
  the rail removal configuration is further characterized
  in that:
  the jaws are connected to each other with the alignment
    pin inhibiting the rotation of the jaws relative to each
    other;
  the first top rail can slide past the top channel lip in a
    direction other than the first direction; and
  the first bottom rail can slide past the bottom channel
    lip in a direction other than the second direction.

8. A solid surface reinforcement system for use with a solid surface, the system comprising:
  a first top and first bottom rail;
  a first clamp comprising:
    a top jaw with a top channel constructed to receive and
      align the first top rail in a first direction, the top jaw
      comprising: a top channel lip, a top shaft hole, a top
      alignment pin hole, and a secondary keyed alignment
      structure;
    a bottom jaw with a bottom channel constructed to
      receive and align the first bottom rail in a second
      direction that is substantially orthogonal to the first
      direction: the bottom jaw comprising a bottom channel lip, a bottom shaft hole, a bottom alignment pin
      hole, and a secondary complementary alignment
      structure;
    an alignment pin disposed of in the top and bottom
      alignment pin holes, constructed to inhibit to rotation
      of the top jaw relative to the botom jaw;
    a shaft disposed of in the top and bottom shaft holes, at
      least a portion of the shaft is threaded;
    a knob connected to the shaft;
    the first clamp having three configurations when the
      first top rail is disposed of in the top channel and the
      first bottom rail is disposed of in the bottom channel;
      a locked configuration where the knob is turned to
        bring the jaws together and create a top rail/
        bottom rail pressure junction between rails, during
        which (1) the rails are fixed in position relative to
        each other and to the first clamp, and (2) the
        secondary keyed alignment structure mates with
        the secondary complementary alignment structure, further inhibiting the rotation of the top jaw
        relative to the bottom jaw;
      a sliding configuration where the knob is turned to separate the jaws relative to the locked configuration and
        release the top rail/bottom rail pressure junction
        between rails, the sliding configuration is further characterized in that:
        the first top rail can slide in the first direction but is
          inhibited from sliding in a direction other than the
          first direction by the top channel lip; and
        the first bottom rail can slide in the second direction but
          is inhibited from sliding in a direction other than the
          second direction by the bottom channel lip; and
      a rail removal configuration where the knob is turned to
        separate the jaws relative to the sliding configuration,
        the rail removal configuration is further characterized
        in that:
        the jaws are connected to each other with the alignment
          pin inhibiting the rotation of the jaws relative to each
          other;
        the first top rail can slide past the top channel lip in a
          direction other than the first direction; and
        the first bottom rail can slide past the bottom channel
          lip in a direction other than the secon direction.

9. A clamp for use with a top and bottom rail, the clamp comprising:
  a top jaw with a top channel constructed to receive and
    align the top rail in a first direction, the top jaw
    comprising: a top channel lip, a top shaft hole, and a top
    alignment pin hole;
  a bottom jaw with a bottom channel constructed to receive
    and align the bottom rail in a second direction that is
    substantially orthogonal to the first direction: the bottom jaw comprising a bottom channel lip, a bottom
    shaft hole, and a bottom alignment pin hole;
  an alignment pin disposed of in the top and bottom
    alignment pin holes, constructed to inhibit to rotation of
    the top jaw relative to the bottom jaw, the alignment pin
    defined a alignment pin longitudinal axis;
  a shaft disposed of in the top and bottom shaft holes, at
    least a portion of the shaft is threaded, the shaft defining
    a shaft longitudinal axis that is orthogonal to the
    alignment pin longitudinal axis;
  a knob connected to the shaft;
  the clamp having three configurations when the top rail is
    disposed of in the top channel and the bottom rail is
    disposed of in the bottom channel:
    a locked configuration where the knob is turned to
      bring the jaws together and create a top rail/bottom
      rail pressure junction between rails, during which the
      rails are fixed in position relative to each other and
      to the clamp;
    a sliding configuration where the knob is turned to
      separate the jaws relative to the locked configuration
      and release the top rail/bottom rail pressure junction
      between rails, the sliding configuration is further
      characterized in that:
      the top rail can slide in the first direction but is
        inhibited from sliding in a direction other than the
        first direction by the top channel lip; and
      the bottom rail can slide in the second direction but
        is inhibited from sliding in a direction other than
        the second direction by the bottom channel lip;
        and
    a rail removal configuration where the knob is turned to
      separate the jaws relative to the sliding configuration, the rail removal configuration is further characterized in that:

the jaws are connected to each other with the alignment pin inhibiting the rotation of the jaws relative to each other;
the top rail can slide past the top channel lip in a direction other than the first direction; and
the bottom rail can slide past the bottom channel lip in a direction other than the second direction.

10. The clamp of claim 9, wherein the bottom shaft hole is threaded and receives the threaded portion of the shaft; wherein turning the knob threads the shaft into the bottom shaft hole and moves the bottom jaw relative to the top jaw.

11. The clamp of claim 9, wherein the threaded portion of the shaft exits the top jaw and the knob is threaded; wherein turning the knob threads the knob onto the shaft and moves the bottom jaw relative to the top jaw.

12. The clamp of claim 9 wherein shaft longitudinal axis defines a plane, and the alignment pin allows limited rotation of the top jaw relative to the bottom jaw in the plane.

13. A clamp for use with a top and bottom rail, the clamp comprising:
a top jaw with a top channel constructed to receive and align the top rail in a first direction, the top jaw comprising: a top channel lip, a top shft hole, a top alignment pin hole, and a secondary pin saddle;
a bottom jaw with a bottom channel constructed to receive and align the bottom rail in a second direction that is substantially orthogonal to the first direction: the bottom jaw comprising a bottom channel lip, a bottom shaft hole, a bottom alignment pin hole, and a secondary pin saddle;
an alignment pin disposed of in the top and bottom alignment pin holes, constructed to inhibit to rotation of the top jaw relative to the bottom jaw;
a secondary alignment pin;
a shaft disposed of in the top and bottom shaft holes, at least a portion of the shaft is threaded;
a knob connected to the shaft;
the clamp having three configuratuions when the top rail is disposed of in the top channel and the bottom rail is disposed of in the bottom channel;
a locked configuration where the knob is turned to bring the jaws together and create a top rail/bottom rail pressure junction between the rails, during which (1)
the rails are fixed in position relative to each other and to the clamp and (2) the secondary alignment pin is disposed of in the top and bottom jaw secondary pin saddles, further inhibiting the rotation of the top jaw relative to the bottom jaw;
a sliding configuration where the knob is turned to separate the jaws relative to the locked configuration and release the top rail/bottom rail pressure junction between rails, the sliding configuration is further characterized in that:
the top rail can slide in the first direction but is inhibited from sliding in a direction other than the first direction by the top channel lip; and
the bottom rail can slide in the second direction but is inhibited from sliding in a direction other than the second direction by the bottom channel lip; and
a rail removal configuration where the know is turned to separate the jaws relative to the sliding configuration, the rail removal configuration is further characterized in that:

the jaws are connected to each other with the alignment pin inhibiting the rotation of the jaws relative to each other;
the top rail can slide past the top channel lip in a direction other than the first direction; and
the bottom rail can slide past the bottom channel lip in a direction other than the secon direction.

14. A clamp for use with a top and bottom rail, the clamp comprising:
a top jaw with a top channel constructed to receive and align the first top rail in a first direction, the top jaw comprising: a top channel lip, a top shaft hole, a top alignment pin hole, and a secondary keyed alignment structure;
a bottom jaw with a bottom channel constructed to receive and align the bottom rail in a second direction that is substantially orthogonal to the first direction: the bottom jaw comprising a bottom channel lip, a bottom shaft hole, a bottom alignment pin hole, and a secondary complementary alignment structure;
an alignment pin disposed of in the top and bottom alignment pin holes, constructed to inhibit to rotation of the top jaw relative to the botom jaw;
a shaft disposed of in the top and bottom shaft holes, at least a portion of the shaft is threaded;
a knob connected to the shaft;
the clamp having three configurations when the first top rail is disposed of in the top channel and the bottom rail is disposed of in the bottom channel;
a locked configuration where the knob is turned to bring the jaws together and create a top rail/bottom rail pressure junction between rails, during which (1) the rails are fixed in position relative to each other and to the clamp, and (2) the secondary keyed alignment structure mates with the secondary complementary alignment structure, further inhibiting the rotation of the top jaw relative to the bottom jaw;
a sliding configuration where the knob is turned to separate the jaws relative to the locked configuration and release the top rail/bottom rail pressure junction between rails, the sliding configuration is further characterized in that:
the top rail can slide in the first direction but is inhibited from sliding in a direction other than the first direction by the top channel lip; and
the bottom rail can slide in the second direction but is inhibited from sliding in a direction other than the second direction by the bottom channel lip; and
a rail removal configuration where the knob is turned to separate the jaws relative to the sliding configuration, the rail removal configuration is further characterized in that:
the jaws are connected to each other with the alignment pin inhibiting the rotation of the jaws relative to each other;
the top rail can slide past the top channel lip in a direction other than the first direction; and
the bottom rail can slide past the bottom channel lip in a direction other than the secon direction.

15. A clamp for use with a top and bottom rail, the clamp comprising:
a top jaw with a top channel constructed to receive and align the top rail in a first direction, the top jaw comprising: a top channel lip, and a top shaft non-circular hole;

a bottom jaw with a bottom channel constructed to receive and align the bottom rail in a second direction that is substantially orthogonal to the first direction: the bottom jaw comprising a bottom channel lip;

a shaft with a non-circular first portion that slides within the top shaft hole, and a second portion that is threaded and exits the top jaw, the shaft fixed to the bottom jaw; wherein the first portion of the shaft and the top shaft hole constructed to inhibit to rotation of the top jaw relative to the bottom jaw;

a knob threaded onto the shaft;

the clamp having three configurations when the top rail is disposed of in the top channel and the bottom rail is disposed of in the bottom channel:

a locked configuration where the knob is turned to bring the jaws together and create a top rail/bottom rail pressure junction between rails, during which the rails are fixed in position relative to each other and to the clamp;

a sliding configuration where the knob is turned to separate the jaws relative to the locked configuration and release the top rail/bottom rail pressure junction between rails, the sliding configuration is further characterized in that:

the top rail can slide in the first direction but is inhibited from sliding in a direction other than the first direction by the top channel lip; and the bottom rail can slide in the second direction but is inhibited from sliding in a direction other than the second direction by the bottom channel lip; and a rail removal configuration where the knob is turned to separate the jaws relative to the sliding configuration, the rail removal configuration is further characterized in that:

the jaws are connected to each other with first portion of the shaft and the top shaft hole inhibiting the rotation of the jaws relative to each other;

the top rail can slide past the top channel lip in a direction other than the first direction; and the bottom rail can slide past the bottom channel lip in a direction other than the second direction.

16. The clamp of claim 15, wherein:

the top jaw and bottom jaw further comprises alignment holes;

the clamp comprises an alignment pin;

wherein during the locked configuration, the alignment pin is disposed of in the alignment holes, further inhibiting the rotation of the top jaw relative to the bottom jaw.

17. The clamp of claim 15, wherein the top jaw further comprises a secondary keyed alignment structure;

the bottom jaw further comprises a secondary complementary alignment structure;

wherein during the locked configuration, the secondary keyed alignment structure mates with the secondary complementary alignment structure, further inhibiting the rotation of the top jaw relative to the bottom jaw.

\* \* \* \* \*